United States Patent [19]

Haag et al.

[11] 3,715,506

[45] Feb. 6, 1973

[54] REMOTE CALL BACK TELEPHONE ANSWERING APPARATUS

[75] Inventors: Herman Haag, Dachau Munich; Willy Muller, Zollikon/Schweiz, Switzerland

[73] Assignee: said Müller, by said Haag

[22] Filed: May 23, 1968

[21] Appl. No.: 731,490

[52] U.S. Cl. ..........................179/6 E, 179/100.1 VC

[51] Int. Cl. ..........................H04m 1/64, G11b 19/02

[58] Field of Search ......177/6 R; 179/100.1 VC, 6 E, 179/6 AC, 100.1 DR

[56] References Cited

UNITED STATES PATENTS

| | | | |
|---|---|---|---|
| 3,376,390 | 4/1968 | Hashimoto | 179/100.1 |
| 3,286,033 | 11/1966 | Lemelson | 179/6 |
| 3,337,690 | 8/1967 | Martin | 179/6 |
| 2,773,123 | 12/1956 | Handschin | 179/100.1 |
| 2,816,167 | 12/1957 | Muller | 179/6 |
| 2,784,254 | 3/1957 | Lane | 179/6 |
| 3,133,992 | 4/1964 | Dickman | 179/6 |

*Primary Examiner*—Raymond F. Cardillo, Jr.
*Attorney*—Semmes & Semmes

[57] ABSTRACT

Remote control means for operating telephone message recording apparatus to play back callers' messages that have been previously recorded on a recording drum. The invention is characterized by the provision of voice-code responsive means for activating the playback means only when a given oral sound is presented at predetermined code-responsive timing intervals.

7 Claims, 11 Drawing Figures

INVENTOR
Herman Haag
Willy Müller
BY Semmes and Semmes
ATTORNEYS

INVENTOR

Herman Haag
Willy Müller

BY Semmes and Semmes

ATTORNEYS

INVENTOR

Herman Haag
Willy Müller

BY Semmes and Semmes
ATTORNEYS

INVENTOR

Herman Haag
Willy Müller

BY Semmes and Semmes

ATTORNEYS

INVENTOR

Herman Haag
Willy Müller

BY

Semmes and Semmes
ATTORNEYS

INVENTOR

*Herman Haag*
*Willy Müller*

BY Semmes and Semmes

ATTORNEYS

REMOTE CALL BACK TELEPHONE ANSWERING APPARATUS

Various systems and apparatus have been proposed for automatically recording the telephone messages of callers. One drawback of many of the known systems is the inability of the subscriber to remotely control the apparatus to play back the previously recorded messages.

The primary object of the present invention is to provide telephone recording apparatus having voice-code responsive playback means, whereby the subscriber may orally command the apparatus — properly timed coded telephone instructions — to playback the messages of previous callers. According to an important feature of the invention, cam means are operable upon reception of a telephone ringing signal to initiate a timing cycle that includes predetermined code-receiving time intervals during which the system is conditioned to receive the code instructions. According to another feature of the invention, announcement drum means are driven simultaneously with the cam means to afford announcements for assisting both the caller and the subscriber in properly using the apparatus.

A more specific object of the invention is to provide apparatus of the type described above, wherein a plurality of selectively operable code switch means are operable between sound and silence-responsive positions to permit establishment by the subscriber of an arbitrary oral code sequence that is required to trip the playback means. Right and false code relay means are provided for enabling and disabling the playback means upon the reception of correct and incorrect code signals, respectively, during the code-receiving intervals established by the cam means.

According to another object of the invention, the machine will accept a message after it has been placed under remote control, and given the proper code for playback. The message receive period takes place right after the code cycle and before the playback cycle.

Other objects and advantages of the invention will become apparent from a study of the following specification when viewed in the light of the accompanying drawing, in which:

FIGS. 6 and 7 illustrate the timing dial pointer positions during normal recording and code-responsive call back conditions, respectively;

Figure 1:
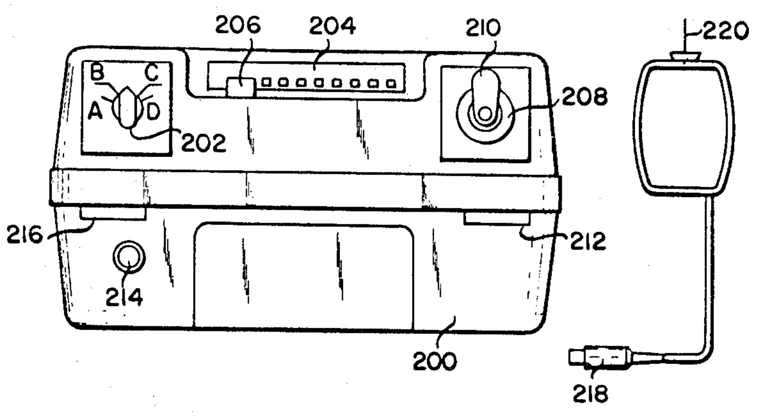
FIG. 1 is a front elevational view of the recording apparatus housing.

Referring first to FIG. 1, the telephone recording and remote call-back apparatus includes a housing 200 having a selector knob 202 for operating a selector switch S1 (described below) between positions A, B, C and D, corresponding with "record-announce or code," "-monitor-announce or code," "answer telephone and monitor telephone messages," respectively. The apparatus also includes an indicator scale 204, a record surface position indicator 206, a timing dial 208, a timing pointer 210, on-off and volume control means 212, microphone socket 214, answer phone ready light 216, microphone plug 218, and microphone start button 220.

Figure 2:
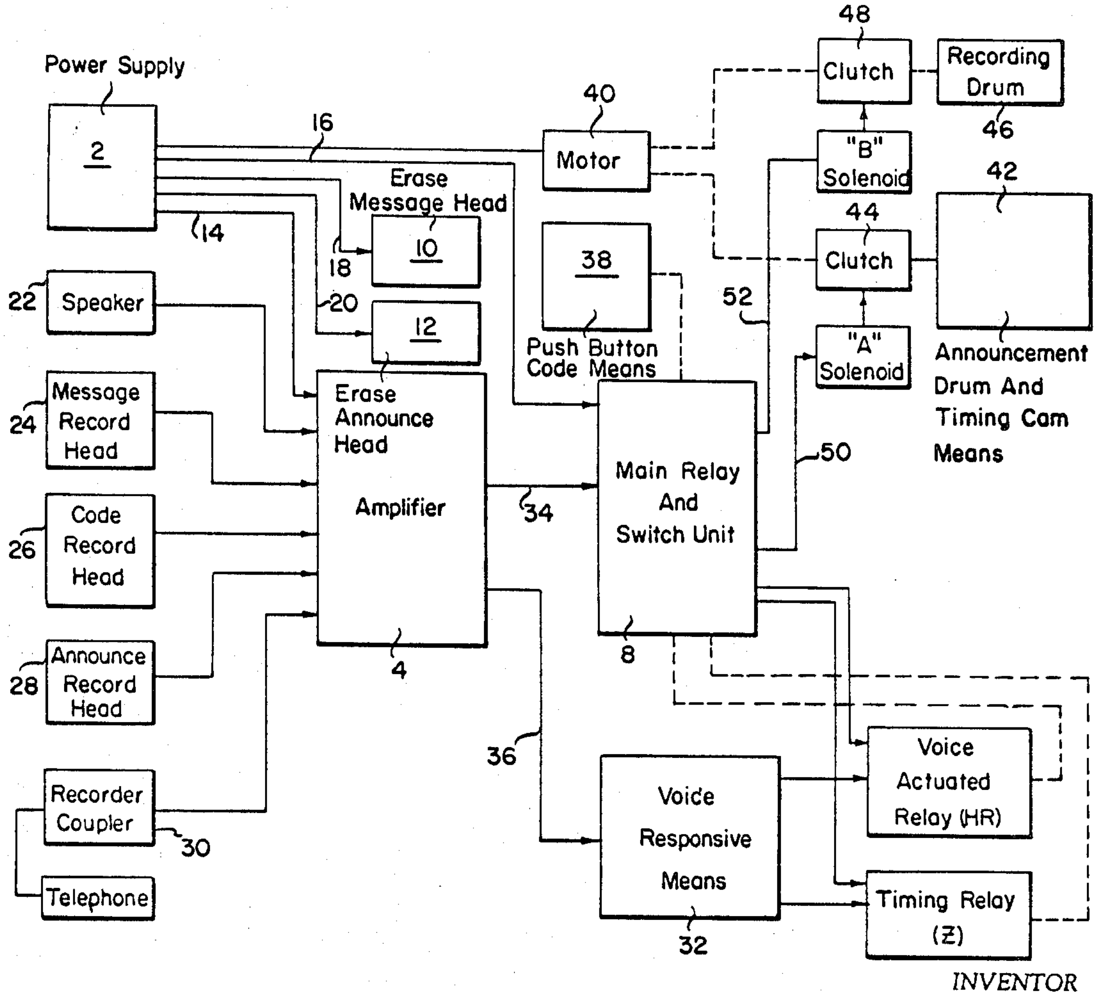
FIG. 2 is a block diagram of the remote call back telephone recording system.

Referring now to FIG. 2, the power supply 2 supplies power to amplifier 4, main relay and switch unit 8, erase message head 10 and erase announce head 12 via conductors 14, 16, 18 and 20, respectively. The amplifier, which is of conventional construction includes additional inputs to which are connected a speaker 22, a message record head 24, a code record head 26, and an announce record head 28. Connected with a further input of the amplifier is a conventional telephone recorder-coupler 30 (for example, a Western Electric recorder coupler No. Ks–19522–L1). The amplifier includes a pair of outputs connected with the main relay and switch unit 8 and with voice responsive means 32 via conductors 34 and 36, respectively, said main switch unit being settable to various operating modes by push button code means 38 as will be described below. The operation of the main switch unit 8 is also controlled by voice actuated relay (HR) and the timing relay (Z), which relays are operable by output signals from the voice responsive means 32.

Also energized by the power supply 2 is a motor 40 that is mechanically coupled with cam means and announcement drum 42 via solenoid operated clutch means 44, and with recording drum 46 via solenoid operated clutch means 48. The "A" and "B" solenoid means for actuating clutches 44 and 48 are energized by output signals from the main relay and switch unit 8 transmitted via conductor means 50 and 52, respectively.

Before proceeding with the detailed description of the invention, it should be mentioned generally that in operation, the subject invention is equipped to answer the telephone, cordially greet the calling customer, give him instructions and emit a tone to signal the caller to begin his message. After the message has been recorded, the machine tells him that the message has been received and it continues to thank the customer, reconfirming the appreciation of the caller's business, which in this modern age is a good selling point and an interesting experience for the customer. The customer is intrigued to be able to carry on a complete conversation with a machine. The greatest selling point is that the operator of the machine can phone in to the machine from anywhere in the country and by normal voice signals at a known time combination sequence he can request that all previously recorded messages be played back to him and he has the option to erase or not to erase these messages after hearing them.

Thus, when the function switch 202 (FIG. 1) is in the "Answer Phone" position and a caller dials the number of the telephone that is connected to the machine, after about two rings a "BEEP" tone will be heard, then the caller will hear the company identification and instructions, telling the caller what specific information is needed and the machine further instructs the caller to start speaking at the sound of the tone. This is the 2nd BEEP tone heard in a normal phone call. After the caller has been allowed to speak, for a preset period of time, the caller will hear an acknowledgement that his message has been received. A thank you is heard in closing, and the call is completed.

"Remote Playback" may be accomplished by the caller if he desires to hear the messages which have been called in and recorded. The phone number is dialed as usual but this time immediately after the first "-BEEP" tone is heard the caller must say a predetermined code word, such as "AH." This sets up the switches for "code countdown." Code countdown will be signified by beeps and/or words. The caller will hear (a) please/beep (b) call/beep (c) back/beep. Code buttons 1, 2 and 3 correspond with (a), (b) and (c), respectively. To get into "complete code" for remote playback, the caller must say the word "AH" again immediately after a beep tone which corresponds to a button which has been pressed in. (the caller must be silent for the areas where buttons are not pressed in). When "complete code" is accomplished, an option exists to record a message before "playback." Immediately after the 3rd code area is heard "back/beep," the caller counts silently . . . 1001, 1002 . . . at that moment the switching will be such that the caller can start speaking and a short message can be recorded on the drum before playback. After complete code is attained, all recorded messages will be heard. Then the machine will ask "do you wish to erase?," if the caller does desire to erase the messages and reset the machine for new messages, he must say "AH" again immediately after the question and/or "BEEP" tone. If the code word was started correctly, erase switching takes place and the caller will hear "ERASED." If the caller does not say the code word, or does not say it properly, he will hear "NOT ERASED" and he will know that the messages are still recorded on the drum.

The "MONITOR" position can be used by the operator if a situation exists where he does not wish to use the "remote call playback" method. In this case, the operator turns the selector knob 202 to "MONITOR." He can then position the pointer, slider and head assembly by slightly depressing the lever in front of the slide pointer, to hear the recorded messages. The volume switch at the right on the front of the machine, should be turned up to a suitable level so that the messages can be heard. Reposition the slider as often as desired to obtain all recorded information. If erasure is not desired, the operator must place the slider pointer at the end of the last message before turning the slider knob back to "answer phone." If erasure is desired on the next incoming message, the operator must place the slider to the extreme left, slightly below zero. (It should be standard practice then to place a call and leave a message. Check in the "Monitor" position then to be assured that erasure is complete, then leave the pointer at the end of the recorded message and switch back to the "answer phone" position to receive incoming calls).

The "Record Announcement" position is used to place the announcement on the drum. The "Normal" Announcement is sometimes changed to suit the specific needs of the operator. This can be done without too much difficulty by the operator. The "-code" Announcement is generally recorded only by qualified Ipsophone service representatives, as there is never a need to change it and the timing sequence is critical. The "Announcement Monitor" position is used to verify the announcements for clarity and the sequence.

RING-UP

Figure 3:
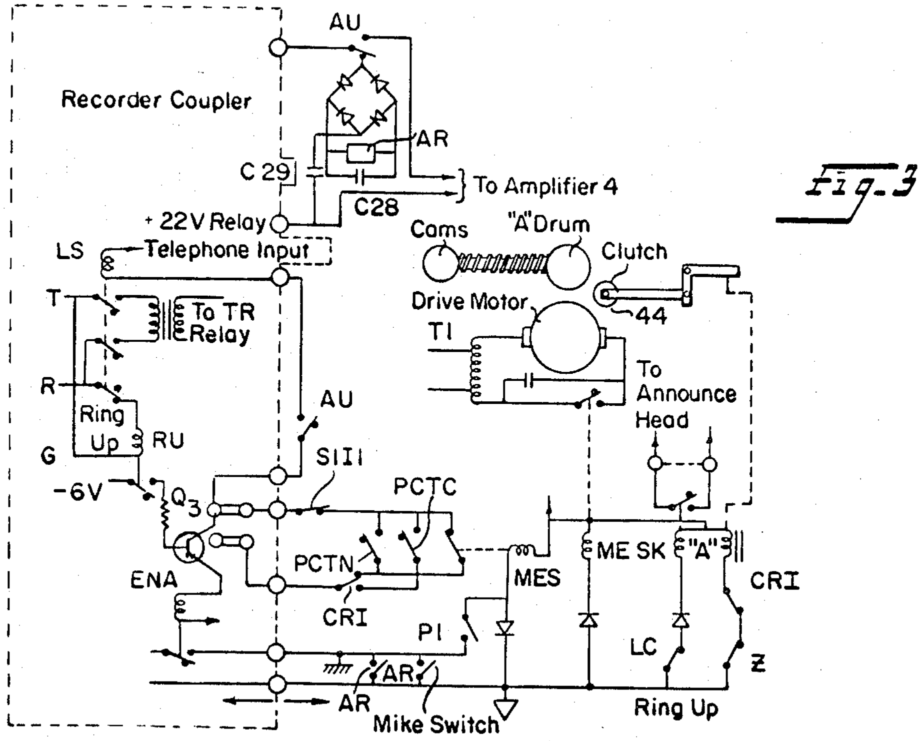
FIG. 3 is a schematic electrical diagram of the recorder coupler means for operating the recorder motor in response to a telephone ring.

Referring now to the ring-up recorder coupler means of FIG. 3, when a phone call comes in, ringing takes place in the recorder coupler and relay RU energizes with the ringing pulses supplied by the telephone company. When ring-up relay RU energizes, bias current saturates Q3, whereby Q3 conducts to establish a chassis ground path through the ENA relay coil. Relay ENA energizes to the chassis ground path to start the recorder cycle. The chassis ground path is now established to the motor-energizing relay coil ME, thereby starting drive motor 40. Silencing relay coil SK is energized to short the announcement head and the input to amplifier 4. A secondary ground path is also established for the announcement drum "A" solenoid through relay Z–6 & 5 and relay CRI–15 & 14 to "A" solenoid coil. This engages a clutch wheel 44 between the drive motor 40 and the announcement drum, which drum is coupled to the cam assembly thru a worm gear. Consequently, the cam rotates when the announcement drum rotates. At 4° rotation of the cams, cam switch PCTN closes, whereby the holding path for ENA is then accomplished. At 10° rotation of the cam P1 closes and maintains a holding path for secondary ground. The MES relay energizes, opening its supplementary holding path for ENA relay. Ring-up ground is now complete and held thru P1.

Figure 5:
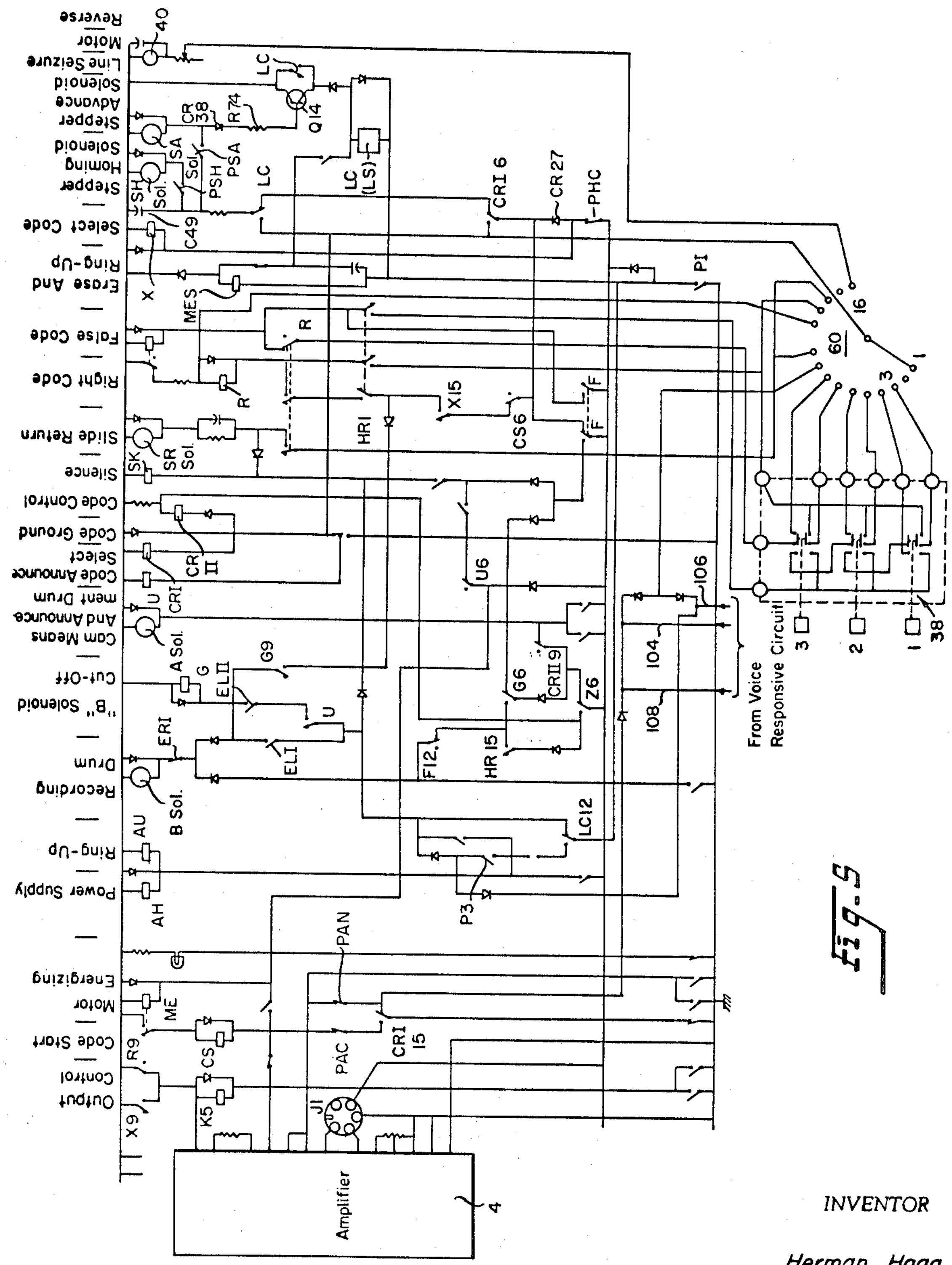
FIG. 5 is a schematic diagram of the main relay and switch means of FIG. 2.
Figure 8:
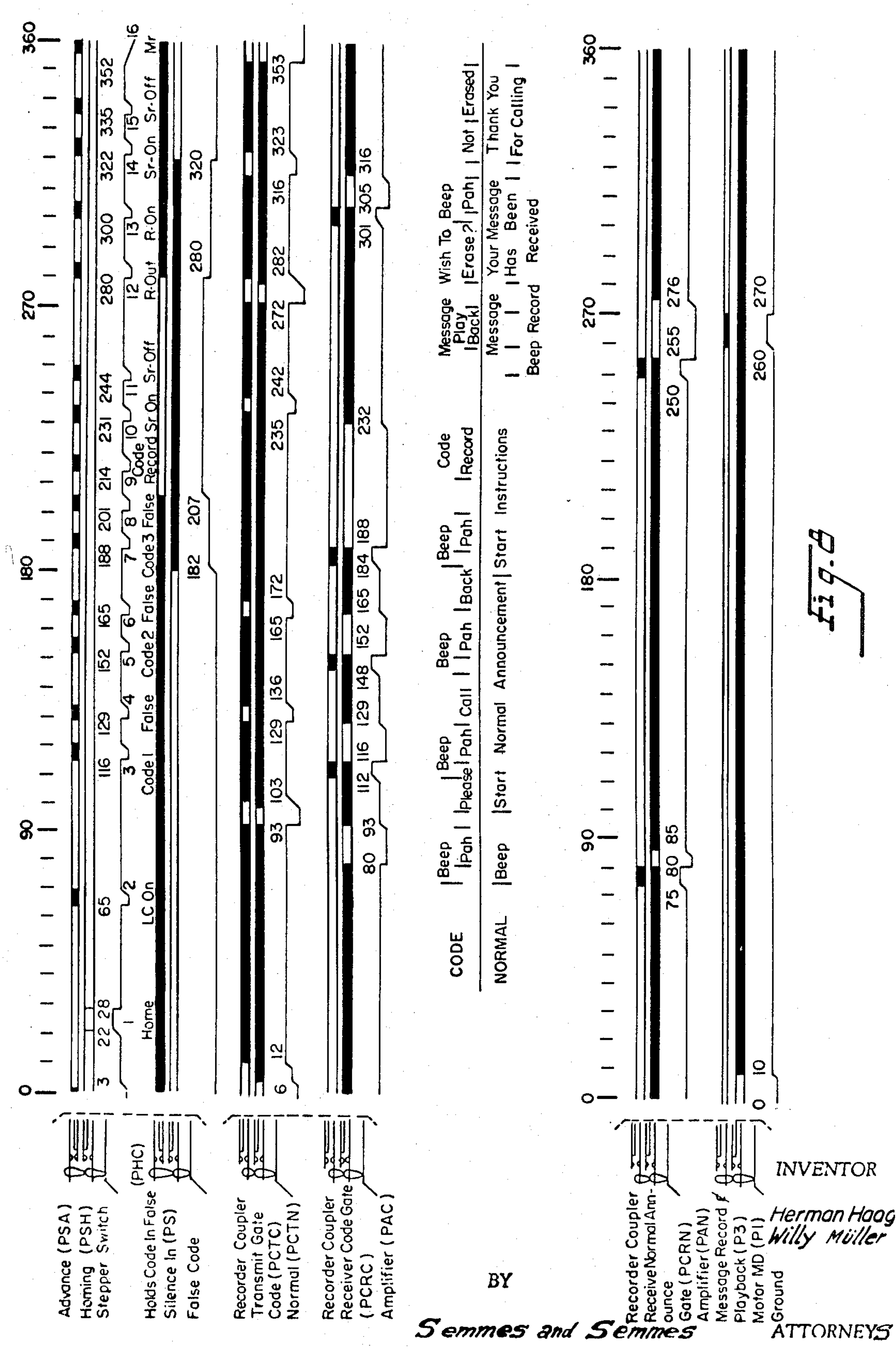
FIG. 8 is a timing diagram illustrating the operation of the cam operated switches.
Figure 11:
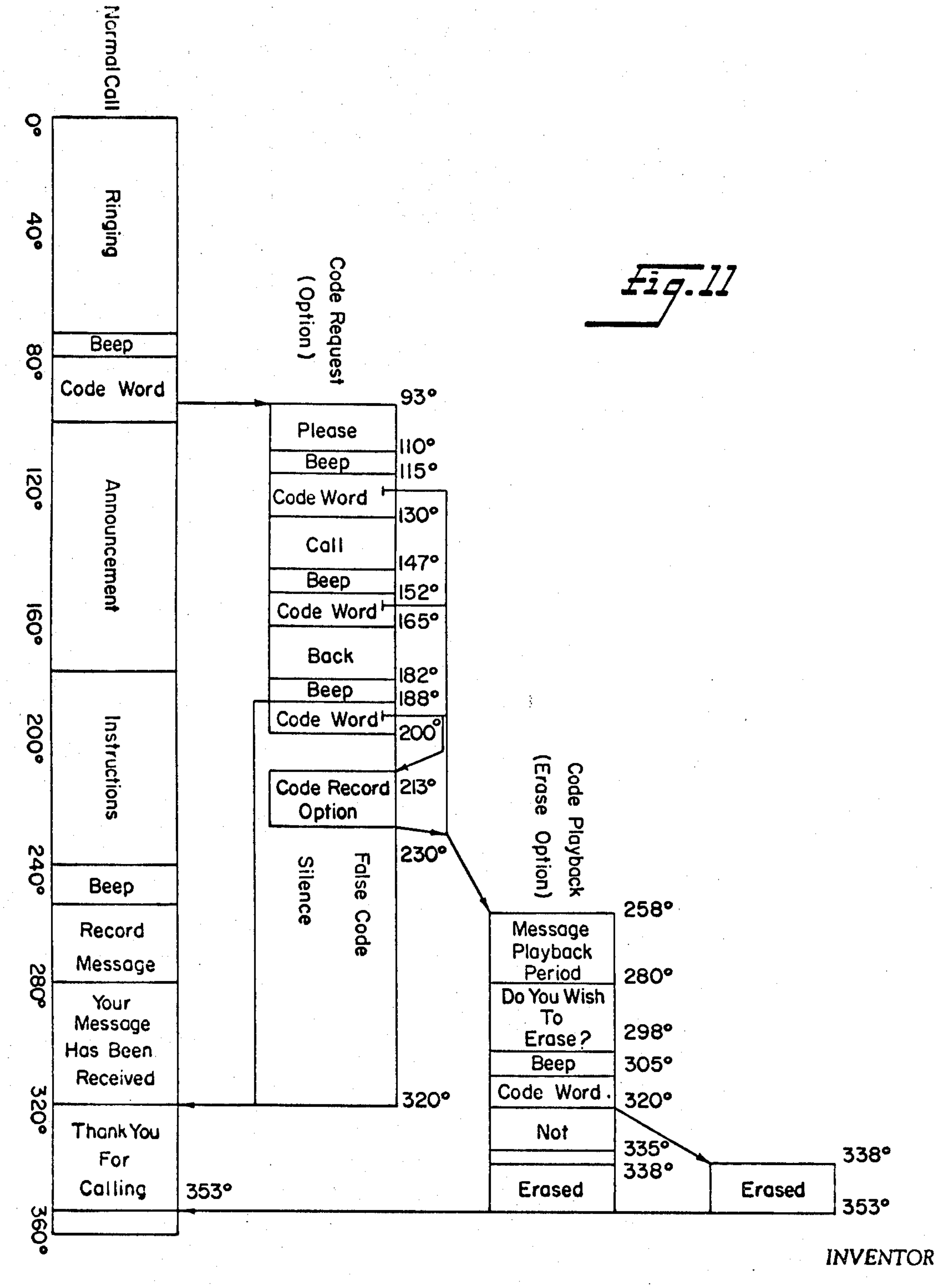
FIG. 11 is a diagram of the cycle function sequence.

Referring now to FIG. 5, a stepping switch 60 is provided having a first homing or start position. Reset of the stepper switch to the home position is accomplished with each incoming call at 20° rotation of the cam. During RING-UP, a ground holding path is established thru cam switch P1 to TB1–23, as already stated. A secondary ground to charge capacitor C49 is provided, whereby the capacitor charges to −24 VDC. Cam switch PSH closes at 20° rotation of the cam, whereby capacitor C49 now discharges thru the homing solenoid, (SH), energizes the homing solenoid and returns the stepper switch to position 1. Cam switch PSH remains closed for 10° and then opens for the remainder of the cycle.

LINE SEIZURE

As homing is accomplished, the cams continue to rotate. At 30°, cam switch PSH opens and capacitor C49 charges. At 65°, cam switch PSA contacts close connecting C49 to stepper switch advance magnet coil. C49 discharges thru step solenoid (SA) coil and CR 38 and R74, turning on transistor Q14 which saturates, extending the −24 VDC pulse which energizes line closure coil to establish a holding path. Position No. 2 on the stepper is open and is only a coincidental step which takes place while LC energization and holding is being accomplished. Line seizure coils AU and AH are energized, and since LC has energized and broken the ground for SK relay, SK now de-energizes and removes the short at amplifier 4 from the announcement head.

Figures 9, 10:
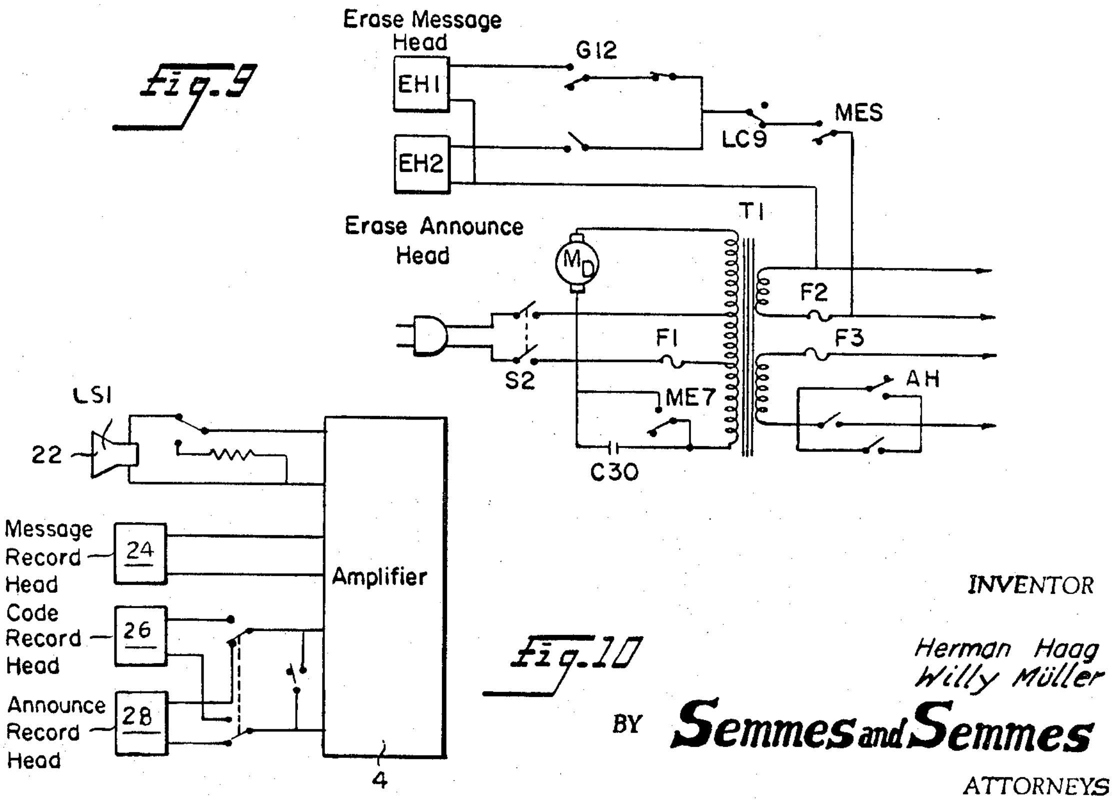
FIG. 9 is a schematic diagram of the power supply means.
FIG. 10 is a diagram of the record head inputs to the amplifier.
Figure 4:
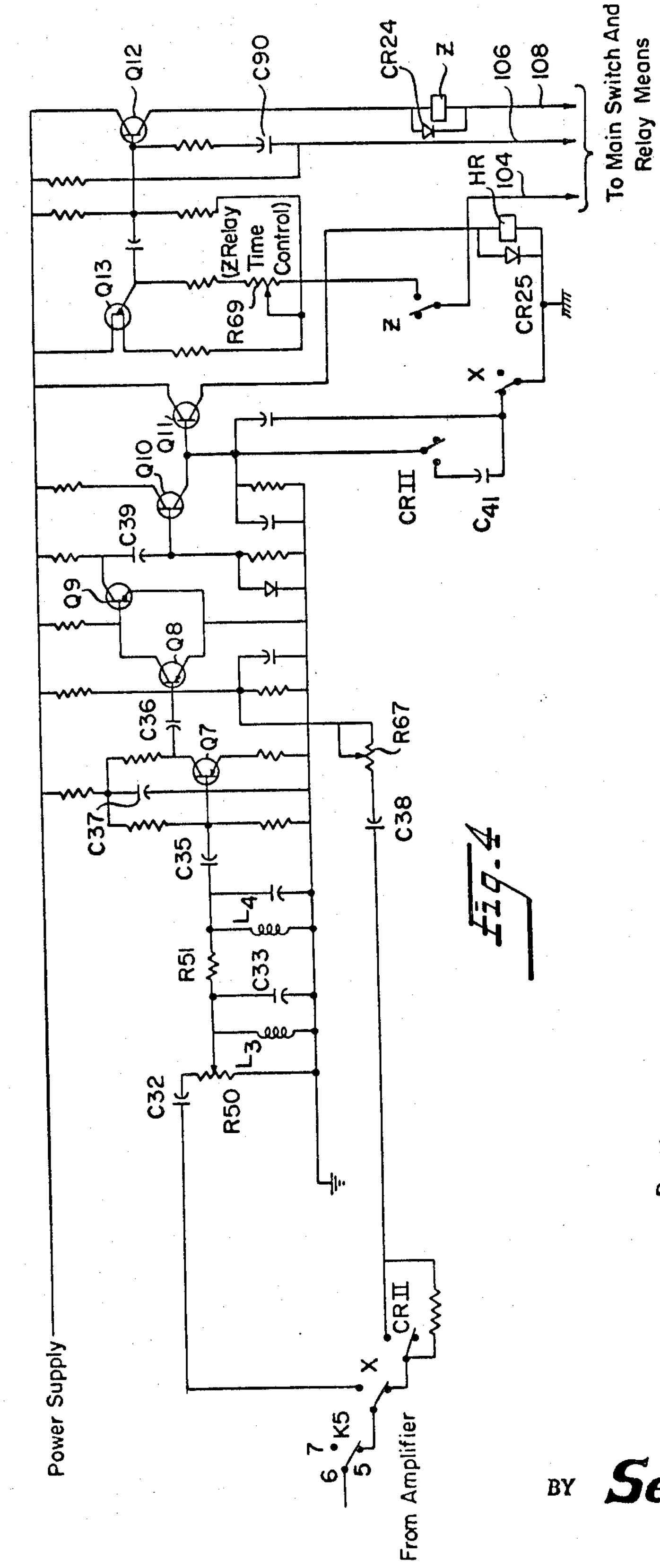
FIG. 4 is an electrical schematic diagram of the voice-responsive control means and the timing relay means of FIG. 2.
Figure 1:
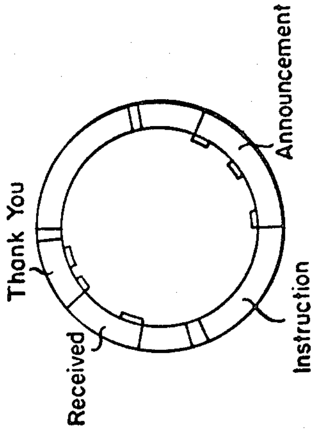

With power supply relay AH energized, power is supplied to amplifier 4, and speaker dummy load resistor R46 (FIG. 10) is placed across the output terminals of amplifier 4. The speaker is used only during manual monitoring of announcement recordings and message recordings. With line seizure relay AU energized, the circuit from amplifier 4 to connector P2–4 of the recorder coupler is closed, thereby placing the voice line at the amplifier. Relay AU completes the ground path from inside the recorder coupler (FIG. 3) to energize LS relay thereby establishing telephone line seizure through its contacts, disrupting the RU relay coil series circuit to stop telephone ringing. The ground path to SK relay coil is broken, and the amplifier 4 is ready to receive the announcement message.

BEEP TONE

At 65° rotation of the cams, the first beep tone is generated. For line seizure, PCTN and AU were closed and LS was energized. Now PCRN closes to complete a ground path from the recorder coupler chassis ground, whereby an audible beep tone is developed in a tone oscillator and is transmitted to the telephone line by induction thru transformer T1. After a period of time, the beep tone stops and PCRN opens at 80°. This first tone signal is given to alert the caller that he must trip the machine into code at this time if he desires to use the option for remote playback of any messages which have been recorded. Immediately after the tone stops, if he wants the machine switching to establish a code sequence option he must say a word with the sound of "AH" in it - such as "hard" or "heart." If the code option is not desired, the caller remains silent and the machine will continue its normal announcement cycle.

NORMAL ANNOUNCEMENT

Secondary ground has been made from chassis through cam switch P1 and the "A" drum continues to rotate. When relay TR in the recorder coupler is energized, the amplifier 4 can receive signals from the telephone lines, and when TR is not energized, signals can be transmitted out INTO the telephone lines from the amplifier. If the code voice signal is not given after the first beep tone, the code option is not used. PCTN opens at 95° allowing LS and TR to de-energize, whereby T relay coil energizes again from the reverse current of the capacitor as it discharges through TR contacts. The PCTN cam switch is open long enough so that relay LS will be de-energized long enough to prevent this beep tone from being heard on the line. As PCTN closes, LS is energized again, but TR relay is not energized because PCRN is now open. The recorder coupler then is ready to transmit the "NORMAL" announcement to the telephone lines. Relay CS is energized, and K5 energizes to open the circuit to the code filter and voice control board, (hereafter referred to as the CODE board). As the announcement drum continues to rotate, the apparatus transmits the "NORMAL" announcement signal from recording head 24 through relay "U" to the amplifier. The announcement that the sponsor has recorded will be heard on the telephone line during one rotation from 100° to 247°. The announcement identifies his company and his product or service and leaves specific instructions to the caller patron as to what information is required from him after he hears the signal BEEP tone to start his message. The signal BEEP tone is created at 247° as PCRN closes. This sets up the recorder coupler to receive the call from the line. It should be noted that because the code option was not taken, the HR relay was not energized and, as will be explained later, the CRI, CRII and "U" code relays will not operate for the duration of the cycle. The stepper switch (PSA) will not advance for the duration of the cycle, as there is no ground available to LC–16, and PCTC, PCRC and PAC are switched out of the circuit and have no effect for the duration of the cycle.

THE CALLER'S NORMAL MESSAGE

The beep tone which was emitted at 247° was the signal to the calling patron to begin his message. PHC opens at 205° releasing relay "X," which keeps the machine from going into code when HR is actuated. CS & K5 relays de-energize at 255° when PAN opens the ground path. PCRN also opens at 255°, but TR is left latched in an energized position for "message record" FUNCTION. The signal path to the voice control section of the code board from amplifier 4 is completed, and P3 closes at 258° to establish a ground path to coil SK, whereby SK–9 and 10 short the amplifier output from reaching recording heads 26 and 28. A charge path is established energizing Z relay coil. The time duration that Z will remain energized is determined by the setting of R69 on the code board (approximately 10 seconds to 45 seconds). Z relay contacts 6 and 5 open the ground path to "A" drum solenoid, stopping the "A" drum and cam assembly from rotating. The caller's message is amplified, and by proper relay switching, the output signal is provided to the voice control circuit, and also to the message recording head 24. A ground is also required at the "B" solenoid for recording to take place. This ground path is ultimately controlled by the voice actuated relay HR. The voice output from amplifier 4 passes through C38 and R67 (HR trip level playback adjustment) and through Q8, Q9, Q10 and Q11 to energize HR relay coil. The amount of time that HR will remain energized without being voice driven is a function of the capacitance at Q11 base. HR is held for the least amount of time during code functions, longer for recording messages and longest for remote playback. Each time the caller stops talking, HR still continues to hold in for about 2 seconds through 55 μfd capacity and the "B" drum rotates, providing that Z relay time is not used up. HR is held to allow continued drum rotation between consecutively spoken words so that the first letter of each word is not clipped during energization time of HR. When "Z" relay coil releases, the caller's message is ended, the "B" drum stops and the "A" drum starts as "Z" relay switches ground from Z–7 to Z–5. The "A" drum continues to rotate, and at 270°, P3 opens, de-energizing TC and SK relays. PCTN opens at 272°, de-energizing the TR relay, re-establishing the conditions of NORMAL ANNOUNCEMENT. From 280° through 320°, the sponsor has recorded an acknowledgement of the message so that the caller is assured that his message was recorded when "Normal" switching takes place. The "A" drum continues to rotate. Between 320° and 353° the sponsor has recorded a respectful "THANK YOU" to the calling party to maintain impressive customer relations.

END "NORMAL" CYCLE

The "A" drum and cam assembly continue to rotate, whereupon PCTN opens to release LS in preparation for the next cycle. At 360°, P1 opens to remove secondary ground. Relays LC, ME, MES, AH, AU, X, K5, (K1, K4, & K3 in K343) and "A" solenoid coil become deenergized in preparation for the next cycle. The cam assembly and "A" drum may coast 1° or 2° into the next cycle, which is incidental and will have no adverse effect on the next call.

REMOTE CODE OPTION (PLAYBACK)

After the first beep tone on an incoming call, an option exists to the caller to acquire a remote playback of all existing messages which have been recorded on the "B" drum. Assume that code button No. 1 (FIG. 5) is pushed in, that PSA has stepped to No. 2 position, that LC is energized, and line seizure has taken place. PAC and PAN both open at 80° which de-energizes K5 and CS, and sets up the relay switching of amplifier K343 so that the signal will be available to the code filter section when voice is injected into the line. The caller must say a word with the sound of "AH" in it such as "hard" or "heart" right after the beep tone, while the cam assembly is rotated from 80° through 93° (he has about 1.2 seconds in which to say this). "X" relay is energized thru PHC and the voice sound actuates the HR relay. A code ground holding path is now established, which also maintains ground for the duration of the cycle. With ground now at LC–16, C49 has a code ground charge path thru LC–16 & 15 and R73 for the duration of the cycle. A beep tone is emitted again at 110° as PCRC closes, setting up the recorder coupler so that the amplifier 4 can receive the word "hard" or "heart." At 116° PSA closes again providing a discharge path for C49 thru the stepper coil. SS steps to the No. 3 position and the ground path continues from SS–W thru J4–1, code selector No. 1 and J4–12 to HR–10. PAC also opens at 116° setting up amplifier relays and K5 so that the voice code signal can get from the amplifier to J3–10 and the HR coil thru the code board. To get into "Right Code," the word "hard" or "heart" must be said after 116° and before PAC closes again at 130° to actuate HR relay again and establish a holding path for "R" relay which is getting its –24V through R77 and the de-energized contacts 8 and 9 of "F" relay. "Right Code" has now been established. If the caller remains silent as the cycle continues and the stepper advances past code selectors No. 2 and No. 3 to SS–8, "Right Code" will be held and the code sequence will be heard on the phone line.

CODE RECORD (OPTION)

At this point during remote code request another option exists for the caller to record a message prior to hearing the message playback sequence. After the word "back" and the BEEP tone is heard, the caller counts silently . . . 1001, 1002 . . . at that time the cam rotation will have reached PSA cam position No. 9 at 213°. The SS wiper places code ground at SS–9, whereby the Z timing relay is energized. CR 43 blocks reverse ground from energizing K5 and CS thru PAN, and a third ground path from SS–9 to the junction of R78 and "G" relay coil, prevents "G" from energizing and locking up when it is not desired. Z relay, when energized, removed ground from the "A" solenoid, stopping the "A" drum and cam rotation. After counting . . . 1001, 1002 . . . the caller can begin leaving a message. HR will then control the "B" drum ground path. When Z timing is up, Z releases, switching ground from the " B" solenoid to the "A" solenoid, allowing the "A" drum and cam assembly to continue the code cycle. PAC closes at 230° and normal ground exists again at Z coil but it will not energize because the "-code record" forced ground is removed from TC–7 as the stepper advances to 10.

SLIDE RETURN

At 230° cam rotation, SS steps to 10, providing a code ground path from SS–10 thru "R"–6 and 7 to the SR (slide return) magnet and to relay coil SK thru CR 17. The SR magnet pulls in and SLIDE RETURN is accomplished, closing ELI and ELII. At 244°, SS steps to 11, removing the ground from the SR magnet.

REMOTE PLAYBACK

After "Right Code," "Code Record," and "Slide Return" are accomplished, PAN opens at 255° removing chassis ground from Z relay coil, TC–6 and "Z" –9. P3 closes at 258° providing ground to (a) ELI and (b) "U" 12 and 13 and ELII to "G" relay coil and to "B" solenoid thru CR14. Contacts of "G" moves ground from G–6 and 5 for "A" magnet to G–6 and 7 for "B" magnet. B drum turns and remote playback is accomplished in the following manner . . . ELI holds "B" solenoid at ground until HR is actuated by recorded voice playback, then a new ground path is controlling "B" drum by means of "B" solenoid. This ground will be maintained until about 6 seconds after there is no playback from the "B" drum. The last message heard of course, will be the "code record" message that was placed on the message drum during this call. (This assures the caller that all recorded messages have been received and saves the expense of another phone call if more than 1 operator is using the machine). Then HR drops out, de-energizing "G" and "B" coils. Remote playback is thus concluded. "G" switches ground back to the "A" selenoid and the cycle continues. The code option can be chosen thru various code selector paths, programmed by the agency or person leasing the machine. This is explained fully in a following "False Code (protective circuit)" description.

QUESTION FOR ERASE

Conditions for remote erase can only take place following a remote playback. At 273°, PCTC sets up switching of the recorder coupler so that the code announcement can be heard again on the line. PSA closes momentarily at 280° and SS steps to 12 shorting "R" coil long enough to de-energize relay "R," and drop its ground holding path through R–15 and 16. PHC closes at 28° actuating "X" relay and the erase question is heard from the code drum. A beep tone is emitted as PCRC closes at 300°. PSA closes momentarily at 300° and SS steps to 13. "R" relay coil awaits control ground through HR 10 and 9 if an erasure is desired. During the time that PAC is open from 305° to 320°, if erasure is desired on the message "B" drum, the word "AH" must be voiced into the phone.

ERASE

As the word "AH" is spoken into the phone, HR actuates. HR now provides the ground path from code ground thru SS–W–13 and HR–10 & 9 to "R" relay coil and "R" -16 & 15 holding path. "R"-6 & 7 close and PSA closes momentarily at 322°. SS steps to 14 which is jumpered to SS–10. The ground path from SS–14 & 10 thru "R" 6 & 7 to SR magnet coil and to SK thru CR17 causes the slide to return andSK silence relay is actuated. Slide return is different this time than slide return for playback. P3 is not closed this time so there is no ground available to energize the "B" solenoid. Erasure does not actually take place during this cycle because LC – 8 & 9 are open at this time. The word "NOT" however is blanked out by SK which is held energized until PSA steps SS to 15 at 335° and the ground path is opened. PSA closes momentarily again at 355° and SS steps to 16 code ground exists and MR is energized which reverses the "B" drum about three-fourths of a turn. It should be noted that motor reverse serves no useful purpose when erase is requested, (because of code ground it is coincidental), but it is needed after remote playback when erase is not requested. PCTC switches back T/R in the recorder coupler to establish the "TRANSMIT" configuration at 353°. The cycle ends at 360° when P1 opens. Erasure actually takes place on the next incoming call. Ring-Up and line seizure takes place, P1 closes at 10° and ground is then established to "B" solenoid. A voltage of −24 volts is impressed across the message erase head to the erase head (ER1). One turn of the "B" drum while this voltage is applied to the erase head will erase all of the caller's messages. When the slide is carried to the right to about 3 percent of the scale, LC releases the 24 volt supply from the erase head and stops the "B" magnet, whereby a message is recorded on the "B" drum, during this NORMAL CALL.

NOT ERASE

When the question for erase is heard following the code remote playback, there is the option to erase or not erase. If erase is not desired, the word "AH" is not voiced and the option is not exercised. SR and SK are not actuated because no ground was passed thru HR–10 & 0 since the period of time that "R" holding path was dropped when SS stepped to No. 12 at 280°. This time then, the word "NOT" is not blanked out by SK because HR–6 & 7 is open when SS steps to No. 14. Code ground is still available at R76 when SS steps to No. 16 at 355° and motor reverse takes place. PSA closes long enough to allow the drum to reverse about three-fourths of a turn. (C47 is across MR for noise suppression). It is necessary that the drum reverse operation must take place after a remote playback when no erase is requested, because C41, C42 and C43 capacitive delay during remote playback will rotate the drum for about 6 seconds after playback discontinues, which is the maximum drum rotation control available between messages. Therefore, if the drum did not reverse and other calls were placed there would be lost message space and the time lapse between the first series of messages and the second series of messages would be too long. HR would drop out after 6 seconds following a remote call back, dropping "G" relay and "B" magnet ground and the cycle would continue without playing back the second series of calls, and if the caller now requests an erase, the second series of messages would be erased without the caller ever realizing that the messages ever existed. If the "code record" option is used, the operator will always know whether or not all recorded messages are played back. He would then return to his machine and manually operate it if something would have happened where his message was not

FALSE CODE

Any time that the "F" relay becomes energized a condition of "False Code" will exist for the remainder of the cycle. Under this condition no message can be recorded and no recorded message can be heard from the message "B" drum. A selective code sequence is therefore programmed on the machine to oppose the efforts of pranksters, cranks or competitors from calling in to obtain or erase recorded messages. When one or more code selector buttons are pressed in, the caller must know which buttons are pressed to be assured that he can obtain "Right Code." Right code can only be obtained by saying the word "Hard" or "Ah" after the first tone signal and after the signal emitted following a selected code button, provided that silence is maintained during the cam cycle where code selector buttons are not pressed "IN." There are four main conditions in which a false code may occur after voicing "Ah" following the first beep tone. (a) If no code selector buttons have been pushed "IN" by the service agent. (b) If "Ah" tone is voiced loud enough while the cam is passing a "Code Select" area where the button has not been pushed "IN." (c) If the "Ah" tone is not voiced during a period while the cam is passing a "code select" area where the button has been pushed in. (d) If "Ah" is not voiced loud enough during a programmed code select period. If preliminary code conditions are established, stepper control will be seized. A charge path is established to the stepper capacitor C150 and to the stepper wiper SS–W for the duration of the cycle.

CONDITIONS OF FALSE CODE

Condition I

SS moves to position 3 at 115°. If "Ah" tone is voiced "F" coil is immediately actuated by ground thru code select switch No. 1. Even if silence is maintained at 115° to 130°, HR and "R" will not be actuated and "F" coil will be actuated thru the code selector buttons 1, 2, & 3 and "R"-12 & 11 relay contacts when the stepper moves to position No. 4, resulting in "False Code."

Condition II

If the No. 2 code select button was pushed in and even if you had accomplished "right code" by saying "Ah" as the cam passed the No. 2 code select area from 150° to 165°, if you would be laughing loudly (ha! ha!) into the phone as the cam passed the No. 3 code select area and the button is "OUT" a ground path would be passed to "F" relay coil, and "false code" would result.

Condition III

Let's assume that code buttons No. 1 and No. 3 are pushed in. You must say the "ah" tone during cam actuation in at least one of these code areas. When the cam reaches the No. 1 code select area SS steps to SS–W–3. If you don't say anything when the stepper is in any of the positions SS–W–3, 4, 5, or 6, nothing will happen because code select button No. 3 is pressed in and the path is open to relay "R"–12 & 11 de-energized contacts. But if you don't say "ah" when SS–W is in position 7, "R" relay will not be actuated, and lockup would not occur thru contacts "R"–16 & 15. Therefore "R" relay would still be de-energized and a ground path would be established as SS moved to SS–W–8 thru J4–11, "F" relay coil creating "false code." So you see if you missed the code call for any reason at No. 1 you could still pick it up in a following select area where the code selector button has been pushed.

Condition IV

If "ah" is not voiced loud enough in a programmed code select area, HR–10 & 9 will not provide the initial actuation and lockup path for "R" relay which in turn provides ground thru "R"–6 & 7 to SR so that slide return can occur for remote playback, which is the main objective of "Right Code." "F" relay can be energized only thru HR–7 & 6 or R–12 & 11 which in turn are dependent on the code selector buttons, and the buttons are dependent on the stepper functions 3 thru 8 which can never take place if HR is not actuated during the code option period between 80° and 90° of cam switch rotation signified by the 1st beep tone. When relay "F" energizes, the following events take place: Relay "F" is locked in the energized position for the duration of the cycle through its contacts 6 & 7, F – 9 & 8 open, dropping the −24V path to "R" relay which in turn drops its holding path if it was energized. Ground is established thru F–15 & 16 thru CR18 and CR19 to PS and "A" magnet respectively and the "A" drum continues to rotate throughout the duration of the cycle. The stepper continues to step and the code sequence is heard on the line. PS closes at 180° supplying ground, actuating SK relay. SK – 9 & 10 shorts out any input to pins 1 & 2 of K343 from the announcement "Normal" and "Code" heads RH2 and RH3 up to 318°. PHC opens at 205° which removes ground from relay "X" coil, C150 charge path, CR1, CRII, "U" and SS–W ground. The "U" relay switches from the code head RH2 to the message head RH3. There is no slide return at actuation points 224° and 310° because no ground is available thru "R"–6 & 7. PS silence was maintained on the line up to 318°, PS closes and RH3 recorded message is heard "Thank you for calling" and the service company identity is again made as a personal advertising option. SS–W–15 does not cause MOTOR and "B" drum reverse this time because ground is not available. P1 opens at 360° de-energizing everything that is dependent on secondary ground and the cycle is ended.

MANUAL MONITOR TELEPHONE MESSAGES

Movement of switch S1 to the "monitor" position closes S1 contacts 4, 8 and 12 on each deck. If a service company should for some reason choose not to use the remote playback option, the machine can be programmed so that no one can obtain messages by calling in nor can they erase by calling in, if all three code selector buttons are not pressed "IN." In this case the person leasing or owning the machine can travel to the machine and manually switch S1 from "Answerphone" position to "monitor" position No. 3 and manually position the slider to obtain the client's or patrons' message information. Also if there should ever be a remote playback malfunction the manual monitor method may be used until a service representative is summoned. In "monitor" position, contacts 4, 8 and 12 are closed on all 3 decks. −12V is supplied to amplifier with S1–III–4 closing the circuit, and ME gets its ground through S1–I–8 and S1–III–9 which starts the drive motor (MD). −24V is always available when main switch S2 is on (as previously described in a foregoing section). The "B" solenoid is grounded, and the "B" drum turns and the slider can be manually moved to the left end of the drum. AH is not energized in this configuration and the messages will be heard on the speaker rather than on the phone. However, the S2 on-off/volume control (R44) must be turned up to a satisfactory audible level. If the entire drum has recordings on it, ERI will be forced open when the slide worm gear carries the slide to the extreme right end. This safety feature stops the "B" drum from rotating and prevents damage to the gear follower.

RECORD (NORMAL ANNOUNCEMENT)

Figure 6:
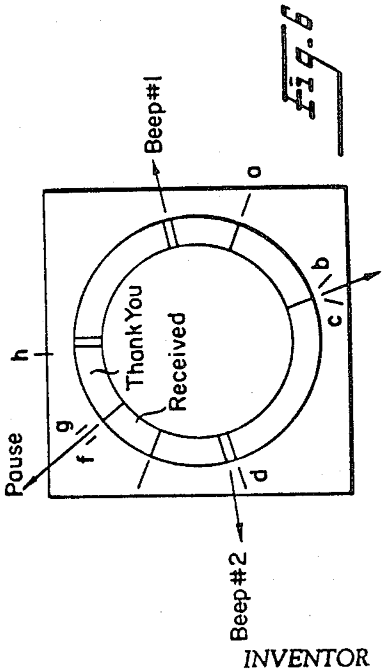

Recording the "NORMAL" announcement on the disk is a job responsibility of the service representative. However, in special cases where the usage of the machine may require frequent normal announcement changes, a microphone and instructions will be left with the person who has leased the machine. With the function switch in the "RECORD" position, the microphone button is pressed to start the machine cycle. The user observes the dial on the machine and states the desired announcement message in the appropriate places as shown on the "normal announcement" dial sketch (FIG. 6). In the process of recording the new message, the old message will be automatically erased. The following general information is recorded in the listed dial spans:

(a) Identification:

Greet the customer. Introduce the usage company, the product and/or service being offered.

(b) Instructions:

Tell the customer to leave his name and any other necessary information and to state the message two times "after the sound of the tone, here is the tone." NOTE: Instructions must end before the dial reaches the TONE area at 274°.

(c) Received:

Inform the customer that the message has been received.

(d) Thank You:

Thank the customer for calling, and identify your company or service once again.

The function switch is turned to the "Announcement Monitor" position and the microphone button is pressed again to start a cycle. Observe the dial and listen to the new recording, making certain that each recorded sequence falls within the limits of its appropriate span. The "Normal Announcement" is recorded as often as necessary, then the function switch is turned to "Answerphone" position for normal use. A remote false code call is then made to be assured that the instructions and "Message Received" areas are properly blanked out and that the total "Thank You" message can be heard.

OPERATION WITHOUT A RECORDER COUPLER

Operation of the Ipsophone without the use of a recorder coupler is generally the same in most respects except that there will be no beep tones and ring-up must be accomplished thru the function of AR relay. The timing and switching sequence of the machine is otherwise the same. For AR ring-up, when the telephone rings, the ringing pulses charge C28 until AR actuates, and "A" magnet gets its ground. P1 closes at 10° and at 65° AU is energized and the ringing path thru AU 7 & 6 is interrupted. The ringing stops and line seizure is accomplished.

REPLACING THE BEEP TONES WHEN NO RECORDER COUPLER IS USED

A tone very similar to the beep tone can be recorded on the announcement disk by whistling gently into the microphone at the appropriate time. The whistle tone need only be recorded at two key places on the disk. One very narrow whistle at the end of the first marked area and one whistle at the area marked "BEEP, NORMAL ONLY" on the masking tape as shown in FIG. 5. All other beep spans may be used right along with the associate adjacent span, using only words as timing indicators, taking care to place the words near the end of the spans when recording the code and normal announcements.

While in accordance with the provisions of the Patent Statutes the preferred forms and embodiments of the invention have been illustrated and described, it will be apparent to those skilled in the art that changes and modifications may be made without deviating from the invention set forth in the following claims.

What is claimed is:

1. Telephone recording and remote call back apparatus, comprising
   - announcement drum means for producing prerecorded announcements;
   - cam means for establishing a timing cycle;
   - means (40,44) initiating operation of said announcement drum and cam means;
   - timing relay means (Z) operable by said cam means at a given first point on the cam cycle to temporarily de-activate said announcement drum and timing cam means for a predetermined time period;
   - recording drum means (46) operable alternately in the recording mode to record a caller's message and in the playback mode to play back the recorded message;
   - voice-responsive relay means (HR) for operating said recording drum means in the recording mode during said predetermined time period; and
   - voice-code responsive means (38,60) cooperating with said voice-responsive relay means to operate the recording drum means in the playback mode upon the receipt of a given series of command sounds at selected second points on the cam cycle.

2. Apparatus as defined in claim 1, and further wherein said means initiating operation of said announcement drum and cam means comprises telephone ring responsive relay means (RU).

3. Apparatus as defined in claim 1, wherein said voice code responsive means further includes normally de-energized right code relay means (R) for maintaining said recording drum means in the playback mode, and stepper switch means (60) and a plurality of code selecting switch means (38) for energizing said right code relay means only when said given series of command signals are properly received.

4. Apparatus as defined in claim 3, and further including voice-responsive code record means operable when said right code relay means are energized both to cause said timing relay means to temporarily de-activate said announcement drum and cam-means, and to cause operation of the recording drum means in the recording mode, whereby messages may be recorded on the record drum prior to remote control playback.

5. Apparatus as defined in claim 3, and further including cam-operated slide return relay means (SR) for repositioning the slider of said recording drum means to obtain all the information recorded thereon.

6. Apparatus as defined in claim 3, and further including cam-operated "question-for-erase" means for operating said announcement drum means during the right code operation to query the caller as to whether or not erase is desired;
   - and voice-responsive erase means for erasing the message that has been recorded on the recording drum means.

7. Apparatus as defined in claim 3, and further including voice-responsive false code means (F) operable by an incorrect series of command sounds for preventing the recordation of messages on, or the playback of messages from, said recording drum means.

* * * * *